May 3, 1938.  F. C. MATTHAEI  2,115,931
AUTOMOBILE STRUCTURE
Filed Sept. 14, 1934
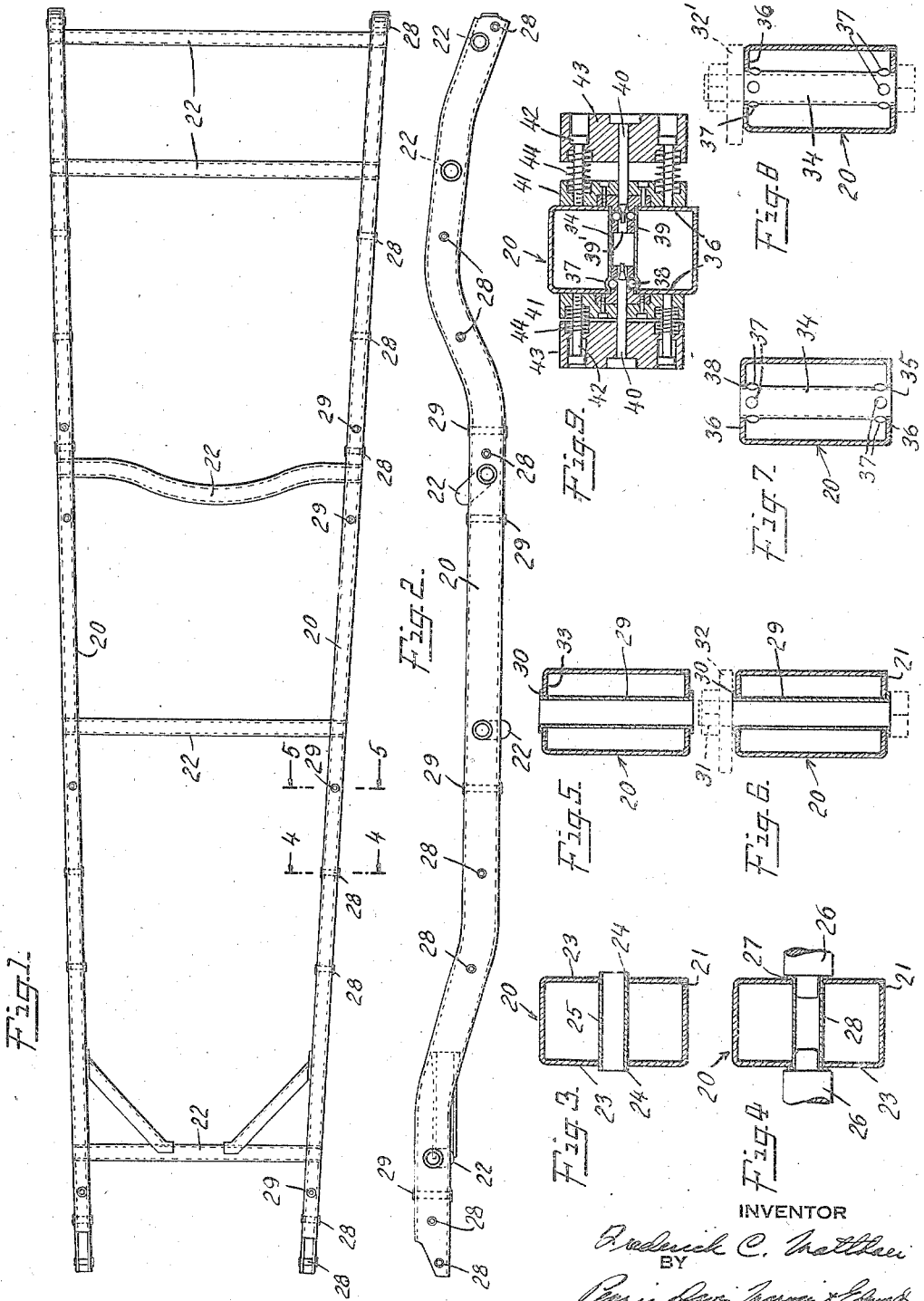
INVENTOR
Frederick C. Matthaei
BY
ATTORNEYS Patented May 3, 1938

2,115,931

UNITED STATES PATENT OFFICE 2,115,931

AUTOMOBILE STRUCTURE

Frederick C. Matthaei, Detroit, Mich.

Application September 14, 1934, Serial No. 743,939

3 Claims. (Cl. 280—106)

This invention relates to automobile structures and has reference particularly to the construction of the chassis frame for an automobile and the securing of the body and other parts upon that frame.

It has been common practice heretofore to make automobile frames from steel strips of channel section forming the side-members of the frame and cross-members connecting them together in the appropriate spaced relation. The body and other parts of the automobile which are mounted directly upon the chassis frame are commonly mounted thereon by means of bolts passing through the members of the frame, the body bolts passing through openings in the flanges of the side-members and other parts being bolted to the frame members in a similar manner.

It has been demonstrated that a greatly superior frame, superior as to strength to withstand distortion, lighter weight and lower manufacturing cost, can be provided by forming the side-members and cross-members of tubes, each of the side-members being formed from a single strip of steel by bending this strip along lines extending longitudinally thereof to a rectangular cross-section and to present a single lengthwise seam which is preferably located at one of the corners of the rectangle, welding this single lengthwise seam, and bending the side-member in the direction of its length to give it the desired shape, preferably including lengthwise curves near both ends to arch over the front and rear axles.

The present invention relates to frames of this character and is concerned particularly with the provision whereby the body and other parts of the car may be rigidly secured in position upon the chassis frame. In a frame of the character described, the metal strip employed in making each side-member is relatively thin, that being possible by reason of the strength supplied by the tubular section of the frame-member. Because of the light weight of the steel strip, securing parts to the side-member by bolts passing through openings in it and tightening up the bolts sufficiently to hold the parts with the requisite rigidity, might occasion a degree of distortion of the metal of the side-members which would be detrimental.

The present invention presents a novel construction for such a chassis frame whereby the parts to be secured to the frame may be secured thereto with the requisite rigidity without occasioning any such detrimental distortion.

In accordance with the invention, aligning circular openings are provided in opposite walls of each frame-member, a tubular member is inserted in each of these pairs of openings, the ends of each tubular member are expanded to hold the member securely in position, and the parts to be secured to the frame are secured thereto by means of bolts which pass through these tubular members. In the case of the body bolts, the tubular members are mounted vertically with their ends expanded into hard contact with the top and bottom walls of the tubular member, and the body bolts pass vertically through the tubular members. For certain of the other parts of the automobile structure which are to be secured to the frame members, the tubular members may pass horizontally through openings in the side-walls of the frame members and be similarly treated to fasten them securely in their positions. In either case, the frame structure includes a tubular frame member with tubular pillars or ferrules extending across the frame-member and having its ends located in openings in opposite walls thereof and having those ends suitably expanded into such hard contact with the adjacent walls of the frame member as to make in effect a unitary structure. As a result, the strain imposed by tightening up on the securing bolts for the various parts to be secured to the frame is taken by these pillars or ferrules in the direction of their length and the structure of the frame-member is supported against distortion by the localized strain applied by the tightening of the securing bolts.

The pillars or ferrules may be of greater length than the corresponding cross-wise dimension of the frame-member, and positioning them may be effected by peening the ends of the tubular ferrules over upon the outer faces of opposite walls of the frame-member. The procedure which I prefer to employ, however, involves making the ferrules of a length corresponding to the distance between the outer surfaces of opposite walls of the frame-member, placing them in position in the openings in the frame-member, and then expanding the ferrules radially to such extent that the ends thereof will be carried into hard engagement with the surrounding walls of the frame-member. A convenient way to do this is to apply a wedge-action to expanding members acting upon the metal of the ferrule intermediate its ends but close enough to the ends to effect the desired expansion of the ends.

The features of the invention will be better understood by reference to the following description in connection with the accompanying drawing which illustrates the preferred embodiment of the invention. In this drawing:

Fig. 1 is a plan view of an automobile chassis frame;

Fig. 2 is a side view thereof;

Figs. 3 and 4 illustrate the steps of forming and securing a transverse ferrule in the tubular side member of the frame of Figs. 1 and 2, Fig. 4 being an enlarged cross-section as seen along the line 4—4 of Fig. 1;

Fig. 5 is an enlarged cross-section of the tubular side member of the frame, showing the arrangement of one of the vertical ferrules, as seen along the lines 5—5 of Fig. 1;

Fig. 6 illustrates the manner in which the body is secured to the tubular side member of the frame by means of one of the vertical ferrules;

Fig. 7 illustrates a cross-section through the tubular side member of the frame fitted with a modified form of vertical ferrule;

Fig. 8 illustrates the apparatus whereby the ferrule of the modified form illustrated in Fig. 7 is secured in place in the tubular side member of the frame; and Fig. 9 illustrates the manner in which the automobile body is secured to the side member of the frame by means of the vertical ferrule illustrated in Fig. 8.

Referring to the drawing, Fig. 1 and 2 illustrate the general characteristics of the frame which comprises a pair of tubular side members 20, each of which is formed of a strip of relatively thin sheet metal bent along longitudinal lines into a rectangular cross-section with the resulting single longitudinal seam located at one corner of the rectangle. This seam, indicated at 21 in Fig. 3, is welded, preferably by fusing one of the projecting edges of the sheet metal strip into the seam. The side members 20 are preferably straight in plan but may be bent more or less out of a straight line as may be required by the design of the automobile on which the frame is to be used, this bending usually including an arch formation for clearing the rear axle and also more or less of an arch at the forward end to extend over the front axle, as is illustrated in Fig. 2. The two tubular side members so formed are then secured together in spaced relation by cross members 22, which are preferably tubular and extend at their ends through openings in the corresponding inner side walls of the tubular side member 20 and at least partially through the outer side walls of the tubular side members, and are secured to either or both opposite side walls of the tubular side members by welding.

The opposite vertical walls 23 of each of the tubular side members 20 are provided at appropriately spaced points, either before or after bending of the side members to shape, with aligned openings in which are inserted the opposite ends 24 of short lengths of butt-seam-welded or seamless steel tubing 25, as is illustrated in Fig. 3. The fit of the tubes 25 in the aligned openings in the opposite vertical side walls 23 of the tubular side member 20 is a tight one, preferably a drive fit. The length of the tube 25 is such that its opposite ends 24 project slightly beyond the outer surfaces of the corresponding wall 23 of the tubular side member 20, as is illustrated in Fig. 3.

Appropriately formed punch-press dies 26 are then inserted in the projecting outer ends 24 of the tube 25 and forced together so that the projecting outer ends 24 of the tube 25 are expanded or peened against the outer surfaces of the corresponding opposite walls 23 of the tubular side member 20, forming integral flanges 27 overlying the walls 23 of the side member 20, as indicated in Fig. 4. The completed ferrule 28 accordingly includes a flat flange 27 at each end which may serve as a washer interposed between the corresponding surface of the side wall 23 of the tubular side member 20 and the part which is to be secured thereto.

The horizontal ferrules 28 are located at appropriately spaced intervals lengthwise of the tubular side member 20, for the reception of bolts for securing to the chassis frame parts of the car which are mounted in position by being secured to the frame, including spring hangers, shock absorbers, the running board, bumpers, spare tire rack and the like, the bushings 28 being of an internal diameter only slightly larger than the outside diameter of the bolts or other fastening elements which extend therethrough so that a snug fit is provided.

Vertical ferrules 29 are formed with lateral end flanges 30 in the same way as is illustrated in Fig. 5. These vertical ferrules 29 are located at appropriate points lengthwise of the tubular side member 20, and are especially adapted for receiving the body bolts 31 which pass through a flange 32 on the automobile body for securing and supporting the latter directly on the flat upper surface 33 of the side member 20 of the chassis frame, as is illustrated in Fig. 6, the ferrule flange 30 serving as a washer upon which the body flange 32 directly rests. Vertical ferrules 29 may be used for other purposes as well as for receiving the body bolts 31 to meet any and all requirements.

Fig. 7 illustrates a modified form 34 of the ferrule in which the ends 35 thereof lie substantially flush with the outer surfaces of the opposite walls 36 of the tubular side member 20 so that there is no end flange or other part of the ferrule interposed between the flat outer surface of either opposite wall 36 and the parts secured thereto, as is the case in the arrangement of Fig. 6. For example, as illustrated in Fig. 8, the flange 32' of the body bears directly upon the outer surface of the upper wall 36 instead of being spaced therefrom by the end flange 30 as in the arrangement of Fig. 6.

The ferrule 34 is secured in position with its opposite ends seated in close fitting openings in the corresponding opposite walls 36 of the tubular side member 20 by being expanded at some point within the side member 20 as at 37. The expanded portions 37 may be conveniently formed in the manner illustrated in Fig. 9 which includes a cage or holder 39 for a plurality of balls 38. The holder 39 fits closely within the interior of the ferrule 34 and the balls are simultaneously movable radially outwardly when a tapered rod 40 engaging the balls is driven longitudinally through an axial opening 39' in the holder or bushing 39. This bushing 39 is secured to a block 41 adapted to abut the outer surface of the wall 36 and carrying guide bolts 42 which pass through an anvil 43 to which the tapered rod 40 is secured and which is urged outwardly by springs 44. The bolts 42 also limit the outward movement of the anvil 43. It will be seen that when the anvil 43 is struck by means of a hammer or other suitable impact or pressing tool, the rod 40 is driven into the axial opening 39' of bushing 39 to force the balls 38 radially outwardly and expand the ferrule 34 at the corresponding points by making a corresponding number of projections 37, four being formed in this instance. The formation of the projections 37 in this way is illustrated at the left hand side of Fig. 9. Each series of projections lie in a circle around the ferrule at a point closely adjacent to the end thereof, that is, just inside the wall of the side-member of the frame. The expansion of the metal of the ferrule at these points expands the ends of the ferrule lying in the openings in the walls of the frame-member, with the result that the ends of the ferrule are carried into hard contact with the walls of the openings in the frame-member and are thus rigidly united thereto.

With the tubular frame-member provided with tubular ferrules extending across it and rigidly secured to it in the manner herein described, the securing in position of the various parts of the car which are mounted upon the frame may be effected without detrimental distortion of the frame-member. The bolts for effecting such securing of the parts of the car pass through these ferrules and the strain incident to tightening them is taken by the ferrules in the direction of their length, with the result that the securing means may be tightened up as much as is considered desirable without any distortion of the tubular frame member which would detrimentally affect its strength to resist the severe strain to which it is subjected in the use of the car.

I claim:

1. An automobile structure comprising the combination of a chassis frame including two side members secured together in spaced relation, each of said side members having opposite walls, a tubular ferrule extending between the said opposite walls of a side member with its ends in openings in the said walls, said ferrule being expanded intermediate its ends to secure its ends in the openings in the side member, and a fastening element extending through the ferrule for securing an automobile part directly to the side member of the chassis frame.

2. An automobile structure comprising the combination of a chassis frame including two side members secured together in spaced relation, each of said side members having opposite walls, a tubular ferrule extending between the said opposite walls with its ends in openings formed thereing, said ferrule being expanded at points adjacent the inner surfaces of said opposite walls to secure it firmly in said openings, and a fastening member extending through the ferrule for securing an automobile part directly to the side member of the chassis frame.

3. An automobile structure comprising the combination of a chassis frame including two tubular side members secured together in spaced relation, a plurality of spaced ferrules extending transversely through each side member with their opposite ends passing through aligned openings in the opposite walls of the side member and lying substantially flush with the corresponding outer surfaces of the side member, said ferrules being expanded intermediate their ends for expanding their ends in the said openings and thus securing them in position in the side members, an automobile body, and fastening elements connected to the body and extending through the ferrules for securing and supporting the body directly on the side members of the chassis frame.

FREDERICK C. MATTHAEI.